(12) United States Patent
Gorczyca

(10) Patent No.: US 7,742,672 B2
(45) Date of Patent: Jun. 22, 2010

(54) COMPOSITION, OPTICAL DEVICE ARTICLE, AND ASSOCIATED METHOD

(75) Inventor: Thomas Bert Gorczyca, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 312 days.

(21) Appl. No.: 11/210,505

(22) Filed: Aug. 24, 2005

(65) Prior Publication Data

US 2007/0047886 A1   Mar. 1, 2007

(51) Int. Cl.
  *G02B 6/10* (2006.01)
(52) U.S. Cl. ...................................................... 385/129
(58) Field of Classification Search ................. 385/126
  See application file for complete search history.

(56) References Cited

U.S. PATENT DOCUMENTS

| | | | |
|---|---|---|---|
| 3,207,735 A * | 9/1965 | Wijga | 524/111 |
| 3,804,938 A * | 4/1974 | Cheh-Jeh | 264/232 |
| 3,809,732 A | 5/1974 | Chandross et al. | |
| 3,873,339 A | 3/1975 | Hudson | |
| 3,953,620 A | 4/1976 | Chandross et al. | |
| 3,993,485 A | 11/1976 | Chandross et al. | |
| 4,138,298 A | 2/1979 | Bobeth et al. | |
| 4,190,623 A | 2/1980 | Bobeth et al. | |
| 4,232,110 A | 11/1980 | Taylor | |
| 4,382,655 A | 5/1983 | Jamieson | |
| 4,422,914 A | 12/1983 | Tsao et al. | |
| 4,436,806 A | 3/1984 | Rendulic et al. | |
| 4,442,198 A | 4/1984 | Tsao et al. | |
| 4,451,636 A | 5/1984 | Tsao et al. | |
| 4,472,020 A | 9/1984 | Evanchuk | |
| 4,481,281 A | 11/1984 | Tsao et al. | |
| 4,536,450 A | 8/1985 | Garito | |
| 4,609,252 A | 9/1986 | Wong et al. | |
| 4,838,634 A | 6/1989 | Bennion et al. | |
| 4,877,717 A | 10/1989 | Suzuki et al. | |
| 4,883,743 A | 11/1989 | Booth et al. | |
| 4,942,102 A | 7/1990 | Keys et al. | |
| 4,950,567 A | 8/1990 | Keys et al. | |
| 4,958,895 A | 9/1990 | Wells et al. | |

(Continued)

FOREIGN PATENT DOCUMENTS

EP   0 943 935   9/1999

(Continued)

OTHER PUBLICATIONS

Byeong-Soo Bae et al, "Photochemical Self-Developing of Doped Sol-Gel Hybrid Glass Waveguides", Organic Photonic Materials and Devices III, vol. 4279, XP-001188955, pp. 101-108, 2001.

*Primary Examiner*—Uyen-Chau N Le
*Assistant Examiner*—Hoang Tran
(74) *Attorney, Agent, or Firm*—Scott J. Asmus

(57) ABSTRACT

A base composition is provided. The base composition includes a binder, a reactive monomer, and an anti-haze additive. The binder may include an optically transmissive polymer. The reactive monomer may be both curable and volatile. The binder and the reactive monomer have differing refractive indices relative to each other. A cured layer formed from the base composition may be formed into an article have particular properties. A method of making the layer is provided.

21 Claims, 1 Drawing Sheet

U.S. PATENT DOCUMENTS

| | | | |
|---|---|---|---|
| 4,965,152 | A | 10/1990 | Keys et al. |
| 5,015,059 | A | 5/1991 | Booth et al. |
| 5,024,909 | A | 6/1991 | Smothers et al. |
| 5,080,931 | A | 1/1992 | Trundle et al. |
| 5,096,790 | A | 3/1992 | Monroe |
| 5,098,804 | A | 3/1992 | Booth |
| 5,270,368 | A | 12/1993 | Lent et al. |
| 5,292,620 | A | 3/1994 | Booth et al. |
| 5,402,514 | A | 3/1995 | Booth et al. |
| 5,541,039 | A | 7/1996 | McFarland et al. |
| 5,719,981 | A * | 2/1998 | Katoh et al. ............ 385/129 |
| 6,334,890 | B1 * | 1/2002 | Goodbrand et al. ...... 106/31.43 |
| 6,434,318 | B1 | 8/2002 | Bischel et al. |
| 6,507,681 | B1 | 1/2003 | Kowalczyk et al. |
| 6,689,900 | B2 * | 2/2004 | Wang et al. ............ 560/182 |
| 6,719,812 | B1 * | 4/2004 | Kitchloo et al. ............ 8/485 |
| 6,724,968 | B2 | 4/2004 | Lackritz et al. |
| 2004/0101782 | A1 * | 5/2004 | Gorczyca ............ 430/290 |
| 2005/0018988 | A1 | 1/2005 | Shih et al. |
| 2005/0053346 | A1 | 3/2005 | Deng et al. |

FOREIGN PATENT DOCUMENTS

| | | |
|---|---|---|
| EP | 1288247 | 3/2003 |
| JP | 56080008 | 7/1981 |
| JP | 60260653 | 12/1985 |
| JP | 05082423 | 4/1993 |
| JP | 07030918 | 1/1995 |
| WO | WO99/46619 | 9/1999 |
| WO | WO 01/31401 | 5/2001 |
| WO | WO 01/51969 | 7/2001 |

* cited by examiner

COMPOSITION, OPTICAL DEVICE ARTICLE, AND ASSOCIATED METHOD

BACKGROUND

The invention may include embodiments that relate to a composition for making an optical device structure, and to the article formed thereby. The invention may include embodiments that relate to a method of forming and/or using the optical device structure.

Modern high-speed communications systems may use polymer optical fibers for transmitting and receiving high-bandwidth data. The properties of polymer optical fibers with respect to flexibility, ease of handling and installation may drive their implementation in high bandwidth, short-haul data transmission applications such as fiber to the home, local area networks, and automotive information, diagnostic, and entertainment systems.

In some types of optical communication systems, there may be the need for interconnecting different discrete components. These components may include such polymer-based devices as lasers, detectors, fibers modulators, and switches. Polymer-based devices, such as waveguides, offer a viable way of interconnecting these components, and offer a potentially inexpensive interconnection scheme. Such polymer-based devices should be able to couple light vertically into or out of the waveguide with good efficiency and low propagation losses, which in turn may be determined primarily by the quality of both the polymer and the device boundary.

Opto-electronic multi-chip modules may be provided with an optical interconnect between the electronic circuitry and the "optical bench" portion of the package. One method to do this may have a vertical cavity surface-emitting laser ("VCSEL") integrated with, and controlled by, the electronic portion of the module. The VCSEL may direct its laser light vertically into the base of the optical portion of the module. An approximate 45-degree angle "mirror" may be used to change the direction of the laser light from a vertical to a horizontal direction, thus directing it into the optical bench. This mirror may be difficult to fabricate with conventional methods for one or more reasons. The mirror should have a surface inclined by about 45 degrees with respect to the horizontal surface of the VCSEL. Furthermore, the mirror surface should be smooth to limit losses in light transmission, and it must be precisely aligned to the underlying VCSEL.

Previously, 45-degree angle mirrors have been defined either by laser ablation of the core polymer material at an appropriate angle, reactive ion etching using a gray scale mask, or embossing the required structure onto the polymer surface. Waveguide structures may be formed by several techniques including coating a lower cladding layer on a suitable substrate and forming a trench in the clad layer by embossing, etching or development, and filling the trench with a core material, and over-coating with a top clad layer. Ridge waveguides may be formed by coating a lower clad and core layer onto a substrate, patterning the core by etching or development to form a ridge, and over-coating with an upper clad layer. Planar waveguides may be formed by coating a lower clad and core material over a substrate, defining the waveguide by UV exposure and depositing an upper clad layer over it. Reactant diffusion may occur between the unexposed core and surrounding clad layers into the exposed core area to form a refractive index (RI) differential in the waveguide.

Polymer/epoxy blends with low epoxy content have been used to make low loss waveguides. Low epoxy content is less than 25 weight percent epoxy. A polymer/epoxy blend with a relatively higher index contrast between core and side-cladding layers may be required to couple light between two different (vertical) layers of waveguide structures while minimizing lateral light loss. This higher contrast may be accomplished with higher epoxy content. However, increasing the epoxy content increases scattering loss in the waveguide structures.

There continues to be a need for low loss radiation curable materials that may be used to make optical devices with control of at least one of topography, refractive index, or composition by a more direct process having fewer manufacturing steps. Furthermore, it may be desirable to develop a process that will enable the formation of optical device structures, such as waveguide structures, having a smooth, tapered edge to allow vertical interconnection with other optical devices or laser devices. Desired optical device structures may have optical properties such as low haze and a relatively high contrast in refractive index.

BRIEF DESCRIPTION

The invention may provide, in one embodiment, a base composition including a mixture of a binder, a reactive monomer, and an anti-haze additive. The binder may include an optically transmissive polymer. The reactive monomer may be both curable and volatile. The binder and the reactive monomer have differing refractive indices relative to each other.

In one embodiment, the base composition may form a cured layer. The cured layer may be included in an article with a substrate, and the cured layer may be disposed on the substrate. The cured layer may include a core layer; and clad layer adjacent to the core layer. The core layer may have a higher refractive index relative to the clad layer, and the clad layer may extend outward from a surface of the substrate further than the core layer extends from the substrate surface.

In one embodiment, an optical device may include a dome structure having a convex surface and a concave depression disposed within the convex surface to define a dimpled dome structure. The dome structure may include a polymer formed from more than 25 weight percent of epoxy monomer and has a light loss of less than about 0.5 percent.

In one embodiment, a method may include mixing an anti-haze additive, a reactive monomer, and a thermoplastic binder to form a base composition. The ratio of reactive monomer to thermoplastic binder may be in a range of greater than about 25:75. The base composition may be formed into a layer. A portion of the layer may be irradiated to react at least a portion of the reactive monomer in the irradiated layer portion. Unreacted reactive monomer may be volatilized from the layer.

DETAILED DESCRIPTION

Figure 1:
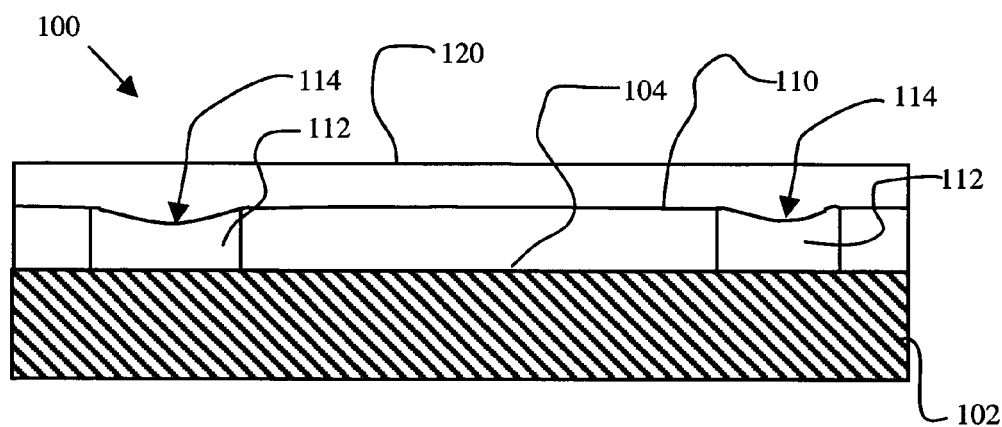
FIG. 1 is a schematic cross-sectional view of an optical device structure according to an embodiment of the invention.

The invention may include embodiments that may relate to a composition for forming an optical device structure. Embodiments may relate to the optical device structure. The invention may include embodiments that may relate to a method of using the composition for forming the optical device structure.

Approximating language, as used herein throughout the specification and claims, may be applied to modify any quantitative representation that could permissibly vary without resulting in a change in the basic function to which it may be related. Accordingly, a value modified by a term or terms, such as "about" and "substantially", may be not to be limited to the precise value specified. In at least one instance, the variance indicated by the term about may be determined with reference to the precision of the measuring instrumentation.

In one embodiment, the invention may provide a base composition including a mixture of a binder, a reactive monomer, and an anti-haze additive. The binder may include an optically transmissive polymer. The reactive monomer may be both curable and volatile. The binder and the reactive monomer may have differing refractive indices relative to each other. After processing of the base composition, a polymer waveguide may be formed that has a relatively high contrast of refractive index between a core region and a cladding region, and may have a relatively low loss of propagating light.

The higher refractive index contrast between core/clad may be obtained by increasing the relative amount of a low refractive index, photo-reactive monomer in the base composition. For example, the difference in monomer content from region to region may result in a higher refractive index difference between the core region, having relatively less monomer content, and a cladding region where the presence of the polymerized epoxy may result in a localized lowering of the refractive index.

Unreacted monomer concentration in a predetermined region may be reduced by, for example, a diffusion and evaporation process. But, for a region having a relatively increased in epoxy monomer concentration there may be a correspondingly increased scattering loss unless the anti-haze additive is added according to an embodiment of the invention. The increase in scattering loss may be due to incompatibility between the binder (e.g., polycarbonate) and the reactive monomer (e.g., epoxy) before and/or during cure.

In one embodiment, a base composition may include at least a binder, a reactive monomer, and an anti-haze agent. The binder may include polymeric materials that are thermally stable during a monomer evaporation step to be described hereinbelow. Further, the binder may include an optically transmissive polymer, that is a polymer matrix that may transmit light.

Suitable binders may include one or more of polysulfone, siloxane-containing polysulfone, polyphenylene oxide, polyphenylene ether, polyetherimide, polyimide, polyester, polycarbonate, polyether ketone, polyether ether ketone, polyvinyl fluoride, cyclo olefin copolymers (COC), acrylate, urethane, cyanate ester, combinations of two or more of the foregoing, and the like. Suitable polyetherimide and polycarbonate resins may contain silicon, such as a siloxane or siloxane derivative.

In one embodiment, the binder may include polysulfone. In one embodiment, the binder may include polyphenylene oxide. In one embodiment, the binder may include polycarbonate. In one embodiment, the binder may consist essentially of polycarbonate. ASTM D-3935 is incorporated by reference to the extent that it discloses terminology and testing procedure for polycarbonate. Property values for a polycarbonate binder suitable for use in one embodiment are listed in Table 1.

TABLE 1

Properties of a suitable polycarbonate binder.

| PROPERTY | ASTM | UNITS | VALUE |
|---|---|---|---|
| Density | D792 | Lbs/in$^3$ | 0.0430-1.12 |
| Melt flow rate at 330° C. at 2.16 Kg | D1238 | g/10 min | 4.0 |
| Vicat softening temperature | D1525 | ° F. | 428 |
| Specific Gravity | D792 | g/cc | 1.2 |
| Refractive index | D542 | — | 1.56 |
| Luminous transmittance @ 0.125 inch | D1003 | % | 88 |
| Water Absorption, @ 24 hours, 73° F. | D570 | % | 0.16-0.4 |
| Water Absorption, @ Saturation, 73° F. | D570 | % | 0.2-0.29 |
| Tensile Strength @ Yield, 73° F. | D638 | psi | 16,000 |
| Tensile Modulus, 1 mm/min @ Yield, 73° F. | D639 | psi | 330,000-860,000 |
| Elongation @ Break, 73° F. | D638 | % | 5 |
| Heat Deflection Temperature @ 66 psi | D648 | ° F. | 270 |
| Heat Deflection Temperature @ 264 psi | D648 | ° F. | 295 |
| Coefficient of Linear Thermal Expansion | D696 | in/in/° F. | $1.5 \times 10^{-5}$ |
| Volume Resistivity | D257 | ohm-cm | $1.0 \times 10^{14}$-$1.0 \times 10^{17}$ |
| Dissipation factor, tin electrode, 60 Hz | D150 | — | 0.001 |
| Dielectric Strength | D149 | V/mil | 490 |

*ASTM references are incorporated herein at least to the extent that they disclose terms, units and test methods.

A suitable acrylate may include one or more of poly (methyl methacrylate), poly (tetrafluoropropyl methacrylate), poly (2,2,2-triflouroethyl methacrylate). Suitable copolymers may include structural units derived from acrylate polymers. In another embodiment, the polyimide may include one or more building blocks of 2,2'-bis[4-(3,4-dicarboxyphenoxy) phenyl] propane dianhydride, 1,3-phenylenediamine, benzophenonetetracarboxylic acid dianhydride and 5(6)-amino-1-(4'-aminophenyl)-1,3-trimethylindane.

A suitable polysulfone may include UDEL P-3703, available from Solvay Advanced Polymers (Alpharetta, Ga.). A suitable polycarbonate may be obtained commercially from GE Plastics (Waterford, N.Y.) or from Bayer Corporation, (Pittsburgh, Pa.). In one embodiment, the polycarbonate may be a high temperature polycarbonate resin that has a relatively increase dissolution rate, such as APEC DP1-9389 from Bayer Corporation.

The binder may be present in an amount greater than about 3 weight percent. In one embodiment, the amount of binder present is in a range of from about 3 weight percent to 25 weight percent, from about 25 weight percent to about 50 weight percent, from about 50 weight percent to about 75 weight percent, from about 75 weight percent to about 90 weight percent, or greater than about 90 weight percent based on the total weight of the base composition. In one embodiment, the binder may be present in an amount less than about 90 weight percent, less than 75 weight percent, or less than 50 weight percent, based on the total weight of the base composition.

The binder may be present in an amount based on a weight percent ratio of the binder relative to the reactive monomer. Suitable ratios include the binder present in an amount in a range of from about 0.5:1 to about 1:1, from about 1:1 to about 1.5:1, from about 1.5:1 to about 2:1, from about 2:1 to about 2.5:1, or greater than about 2.5:1 of binder to reactive monomer. In one embodiment, the ratio is about 3:1 of binder to reactive monomer by weight.

Suitable reactive monomers may have one or more property selected from compatibility with the binder, polymerizability by exposure to radiation, and vaporizability (via, e.g., migration, evaporation or pervaporation) in a monomer form during a bake step, and the like. Pervaporation refers to the concentration of the reactive monomer using a semipermeable membrane (or layer) through which the passage of the reactive monomer may be selectively controlled. In one embodiment, the monomer may be mono-functional; that is, it may function as a thermoplastic in the base composition. Alternatively, the monomer may be poly-functional; that is, it may function as a thermosetting polymer matrix after it has been polymerized. The reactive monomers may react with either or both of themselves and the binder during polymerization.

Suitable reactive monomers may be characterized with reference to their functional groups, and may include one or more of acrylic monomer, cyanate monomer, vinyl monomer, glycidal ether monomer, and the like. In one embodiment, the reactive monomer comprises an oxirane. In one embodiment, the reactive monomer comprises an epoxy. In one embodiment, the reactive monomer consists essentially of an epoxy monomer.

Suitable acrylic reactive monomers may include one or more of methyl methacrylate, 2,2,2-trifluoroethyl methacrylate, tetrafluoropropylmethacrylate, benzyl methacrylate, and glycol-based and bisphenol-based diacrylates and dimethacrylates. Suitable oxirane resins may include one or more of aliphatic epoxies, cycloaliphatic epoxies, or aromatic epoxies, or oxetane-type analogs thereof. In one embodiment, an epoxy based reactive monomer may include one or more bisphenol-based epoxies, such as bisphenol A diglycidyl ether and bisphenol F diglycidyl ether, hydrogenated bisphenol-based, or novolak-based epoxies. Other suitable reactive monomer may include one or more cyanate esters, styrene, allyl diglycol carbonates, and the like. Suitable reactive monomers may include one or more differing type of functional group.

The reactive monomer may be present in an amount greater than about 25 weight percent. In one embodiment, the amount of reactive monomer present is in a range of from about 25 weight percent to 35 weight percent, from about 35 weight percent to about 45 weight percent, from about 45 weight percent to about 50 weight percent, from about 50 weight percent to about 75 weight percent, or greater than about 75 weight percent based on the total weight of the base composition. In one embodiment, the reactive monomer may be present in an amount less than about 90 weight percent based on the total weight of the base composition.

Suitable anti-haze additives may include, for example, an aromatic ester composition. Examples of such aromatic ester compositions suitable for use may include, but are not limited to, one or more of benzoic acid esters of alkylene or polyalkylene glycols, as well as other polyol benzoates. Suitable benzoic acid esters may include one or more of neopentyl glycol dibenzoate (BENZOFLEX S-312), triethylene glycol dibenzoate (BENZOFLEX S-358), glyceryl tribenzoate (BENZOFLEX S-404), trimethylolethane tribenzoate (BENZOFLEX S-432), and pentaerythritol tetrabenzoate (BENZOFLEX S-552). BENZOFLEX is a registered trademark of Velsicol Chemical Corp. (Chicago, Ill.). In one embodiment, the anti-haze additive may consist essentially of pentaerythritol tetrabenzoate.

Suitable anti-haze additives may have melting points in a range of greater than about 35 degrees Celsius. In one embodiment, the anti-haze additive may have a melt point at a temperature in a range of from about 45 degrees Celsius to about 55 degrees Celsius, from about 55 degrees Celsius to about 65 degrees Celsius, from about 65 degrees Celsius to about 75 degrees Celsius, from about 75 degrees Celsius to about 85 degrees Celsius, from about 85 degrees Celsius to about 95 degrees Celsius, from about 95 degrees Celsius to about 105 degrees Celsius, or greater than about 105 degrees Celsius. In one embodiment, an anti-haze additive may tend to supercool and to recrystallize relatively slowly.

The anti-haze additive may be present in the base composition in an amount in a range of from about 0.001 weight percent to about 0.01 weight percent, from about 0.01 weight percent to about 0.02 weight percent, from about 0.02 weight percent to about 0.1 weight percent, from about 0.01 weight percent to about 0.5 weight percent, from about 0.05 weight percent to about 1 weight percent, or greater than about 1 weight percent, based on the total weight of the composition. In one embodiment, the anti-haze additive may be present in an amount in a range of from about 0.1 weight percent to about 20 weight percent, based on the total weight combination of reactive monomer and binder. In one embodiment, the anti-haze additive may be present in an amount of about 0.05 weight percent based on the combined weight of the binder and the reactive monomer.

In addition to the binder, the reactive monomer, and the anti-haze additive, the base composition may further include one or more of a photo-catalyst, a photo-initiator, a co-catalyst, an anti-oxidant, or other additive. Suitable other additives may include one or more of a chain-transfer agent, photo-stabilizer, volume expander, free radical scavenger, contrast enhancer, nitrone, UV absorber, or a solvent. A solvent may facilitate spin coating the base composition onto a substrate.

The other additives, while optional, may be present at a combined weight, relative to the total weight of the base composition, of less than about 90 percent. In one embodiment, the other additives combine to be present in an amount in a range of from about 1 percent by weight to about 99 percent by weight based on the weight of the base composition. In one embodiment, the monomer preferably may include from about 5 percent to about 70 percent of the binder.

Suitable photo-initiators may include one or more of triarylsulfonium hexafluoroantimonate salt or triarylsulfonium hexafluorophosphate salt (e.g., CYRACURE) photo-initiators, or, for an acrylate monomer, 1-hydroxy-cyclohexyl-phenyl-ketone, 2,2-dimethoxy-1,2-diphenylethan-1-one or 2-methyl-1[4-(methylthio)phenyl]-2-morpholinopropan-1-one (e.g., IRGACURE) photo-initiators. The photo-initiator may be present in an amount sufficient to polymerize the reactive monomer upon exposure to radiation. In one embodiment, the photo-initiator may be present in an amount from about 0.01 parts to about 0.1 parts per 100 parts by weight of the base composition. In another embodiment, the photo-initiator may be may present in an amount from about 0.1 parts to about 5 parts per 100 parts by weight of the base composition.

Suitable photo stabilizers may include hindered amine light stabilizers. I one embodiment, the photo stabilizer may include poly[(6-morpholino-s-triazine-2,4-diyl)[2,2,6,6,-tetramethyl-4-piperidyl)imino]-hexamethylene[2,2,6,6,-tetramethyl-4-piperidyl)imino)] available from Cytec Industries (Charlotte, N.C.) under the trade name CYASORB UV3346.

Curing time may be shortened by adding a photo-sensitizer, such as, but not limited to, benzoin, benzoin methyl ether, benzoin ethyl ether, benzoin isopropyl ether, benzil (dibenzoyl), diphenyl disulfide, tetramethyl thiuram monosulfide, diacetyl, azobisisobutyronitrile, 2-methyl-anthraquinone, 2-ethyl-anthraquinone or 2-tert-butylanthraquinone, to the monomer, oligomer, or polymer component or its solution. The proportion of the photo-sensitizer may be up to about 5 percent by weight based on the weight of the base composition.

Suitable antioxidants may include one or more phenols, such as hindered phenols. In one embodiment, the antioxidant may include one or more of tetrakis[methylene(3,5-di-tert-butyl-4-hydroxyhydrocinnamate)]methane (commercially available under the name IRGANOX 1010 from Ciba-Geigy Corporation (now Novartis, Basel, Switzerland)); sulfides; organoboron compounds; organophosphorous compounds; and N,N'-hexamethylene bis(3,5-di-tert-butyl-4-hydroxy hydro cinnamamide) (available from Ciba-Geigy under the trade name IRGANOX 1098).

Suitable chain-transfer agents may terminate a growing oligomer chain and start a new chain with a monomer, may build a disulfide bond with another thiol radical, or may terminate another oligomer chain. In one embodiment, the chain-transfer agents may include N-dodecanethiol.

Volume expanding compounds may include such materials as the spiral reactive monomers referred to as Bailey's monomer. Suitable free radical scavengers may include oxygen, hindered amine light stabilizers, hindered phenols, 2,2,6,6-tetramethyl-1-piperidinyloxy free radical (TEMPO), and the like.

Suitable contrast enhancers may include free radical scavengers such as nitrones. UV absorbers may include benzotriazole, hydroxybenzophenone, and the like.

Suitable substrate material may include one or more of a glass, quartz, plastic, ceramic, or metal. Suitable plastic may include thermoplastic material, thermoset material, or a composite thermoset/thermoplastic material. The plastic material may be reinforced. In one embodiment, the substrate may include a crystalline material, such as a semiconductor material. Suitable semiconductor material may include one or more of aluminum, silicon, gallium, boron, indium, or arsenic. In one embodiment, the semiconductor may include one or more of silicon oxide, gallium nitride, boron nitride, aluminum gallium nitride, gallium arsenide, or silicon nitride. In one embodiment, the substrate may be a wafer having a high surface quality and relatively high heat sink properties. In another embodiment, the substrate may include a cladding material that forms a clad layer.

A mask may be used to pattern an area of the base composition by exposing an unmasked portion to curing radiation. Suitable curing radiation may include ultraviolet (UV) radiation. In addition to UV radiation, other forms of irradiation, such as, a direct-write laser, e-beam, and the like may be used. Exposure of the reactive monomer to the curing radiation may form the monomer into a cured polymer layer. By 'cured', only a portion of the polymerizable content need be cured.

The mask used for defining the area to be exposed to the radiation source may have various shapes, sizes, and different degrees of grayscale. Different grayscales will produce regions of different compositions based on a concentration gradient that corresponds the to degree of exposure. The use of a grayscale mask may thus be used to produce different topographies or array of topographies in a single exposure of a single layer of a binder.

The cured layer formed from the base composition subsequently may be baked to volatilize any remaining unreacted reactive monomer. The residual reactive monomer may volatilize preferentially from an area of the cured polymer layer not exposed to curing radiation, that is, an unexposed area. Residual reactive monomer (not having been reacted) that remains in an exposed area, or cured portion may volatize as well the monomer from the unexposed regions. In one embodiment, the baking process may evaporate volatile reactive monomer component from the unexposed areas to create an optical device structure that may include an embodiment of the invention.

Suitable baking temperatures may be greater than about 50 degrees Celsius. In one embodiment, the baking temperature may be in a range of from about 50 degrees Celsius to about 75 degrees Celsius, from about 75 degrees Celsius to about 100 degrees Celsius, from about 100 degrees Celsius to about 125 degrees Celsius, from about 125 degrees Celsius to about 150 degrees Celsius, from about 150 degrees Celsius to about 175 degrees Celsius, from about 175 degrees Celsius to about 200 degrees Celsius, from about 200 degrees Celsius to about 225 degrees Celsius, or greater than about 225 degrees Celsius. In one embodiment, the baking temperature may be in a range of from about 160 degrees Celsius to about 190 degrees Celsius.

In one embodiment, radiation-induced polymerization of the reactive monomer may be carried out such that only a portion of the polymerizable reactive monomer may be polymerized. Remaining or residual reactive monomer may be volatilized or removed from the film layer in a subsequent bake step. Incomplete polymerization may lead to optical devices formed from components having surfaces with controlled topographies, compositional changes, and/or properties that may be different from those components where all of the reactive monomer in the exposed area may be polymerized. That is, gradients zones transition regions may be formed.

A surface of the optical device structure may have a first area and a second area, such that each of the areas may have a surface topography and a composition that differs from at least one other area. The first area and the second area may be spaced from each other on the optical device structure. For example, the first area could be the surface on which an optical device structure may be formed, and the second area could be the surface of the optical device structure itself.

By controlling process conditions and the composition of the binder, a variety of surface topographies may be formed. In one embodiment, the surface topography may include at least one step structure. In differing embodiments, the step structure may have one or more of an angled, concave, or convex profile. In one embodiment, the step structure may form an angle in a range of from about 5 degrees to about 15 degrees, from about 15 degrees to about 30 degrees from about 30 degrees to about 45 degrees, from about 45 degrees to about 90 degrees with respect to a plane defined by the surface of the substrate.

With reference to a compositional change, the compositional change may result from one or more of: the polymerization of the monomer in the radiation-exposed areas, concomitant migration of adventitious monomer from the unexposed areas to the radiation exposed areas, concomitant migration of adventitious monomer from the unexposed areas from the radiation exposed areas, and volatilizing of reactive monomer.

In at least some embodiments, the composition change may influence a property value associated with at least one of coefficient of thermal expansion, glass transition temperature, refractive index ("RI"), birefringence, light transmission, modulus, dielectric properties, or thermal conductivity of the optical device structure. The difference in refractive index between materials provides measurement of the amount a propagating light wave will refract or bend upon passing from one material to another material in which the velocity of the propagating light wave may be different. The anti-haze additive may, in one embodiment, compatibilize otherwise immiscible or incompatible binder/reactive monomer materials.

A consequence of the composition or concentration differential that is fixed during baking may be the concomitant creation of a gradient in the refractive index between a first region and a second region of the optical device structure. The first region and the second region of the optical device structure may be represented, for example, by a core layer and a clad layer, respectively. The index of refraction of a medium may be defined as the speed of light in a vacuum divided by the speed of light in the medium.

Thin film gradient refractive index structures may be fabricated by controlling UV dose, amount of evaporation and initial starting materials. A gradient refractive index waveguide may be preferable over a step structure refractive index waveguide because it provides a relatively lower loss light transmission.

In one embodiment, the refractive index gradient between core (i.e., a first region) and clad (i.e., a second region) may be at least 0.1 percent. In some optical device structures described herein, the refractive index gradient between clad and core may be in a range of from about 0.1 percent to about 0.2 percent, from about 0.2 percent to about 0.5 percent, from about 0.5 percent to about 0.75 percent, from about 0.75 percent to about 1 percent, from about 1 percent to about 2 percent, from about 2 percent to about 3 percent, from about 3 percent to about 4 percent, from about 4 percent to about 5 percent, or greater than about 5 percent.

For fully polymeric systems in which both the clad and core comprise fully polymerized material, a difference in refractive index between core and clad of up to about 50 percent difference may be achieved. The refractive index gradient between clad and core may be in a range of from about 5 percent to about 10 percent, from about 10 percent to about 20 percent, from about 20 percent to about 30 percent, from about 30 percent to about 40 percent, from about 40 percent to about 50 percent, or greater than about 50 percent. For example, an optical device structure may include a core having a refractive index of about 1.59 and a clad having a refractive index of about 1.55 would have a smooth refractive index gradient of about 2.6 percent across a transition width from about 0.5 micrometers to about 3 micrometers.

With reference to FIG. 1, a device 100 according to an embodiment of the invention is shown. The device 100 includes a substrate 102 having a surface 104. Disposed on the substrate surface 104 is a cured layer 110 that was exposed to irradiating energy to react the reactive monomers in the base composition. Unexposed and non-irradiated portions 112 of the cured layer 110 define a concave depression 114 and are core layers (two are shown). The remaining portions of the cured layer 110 are clad. The cured layer 110 may be over coated with a protective coating 120.

Figure 2:
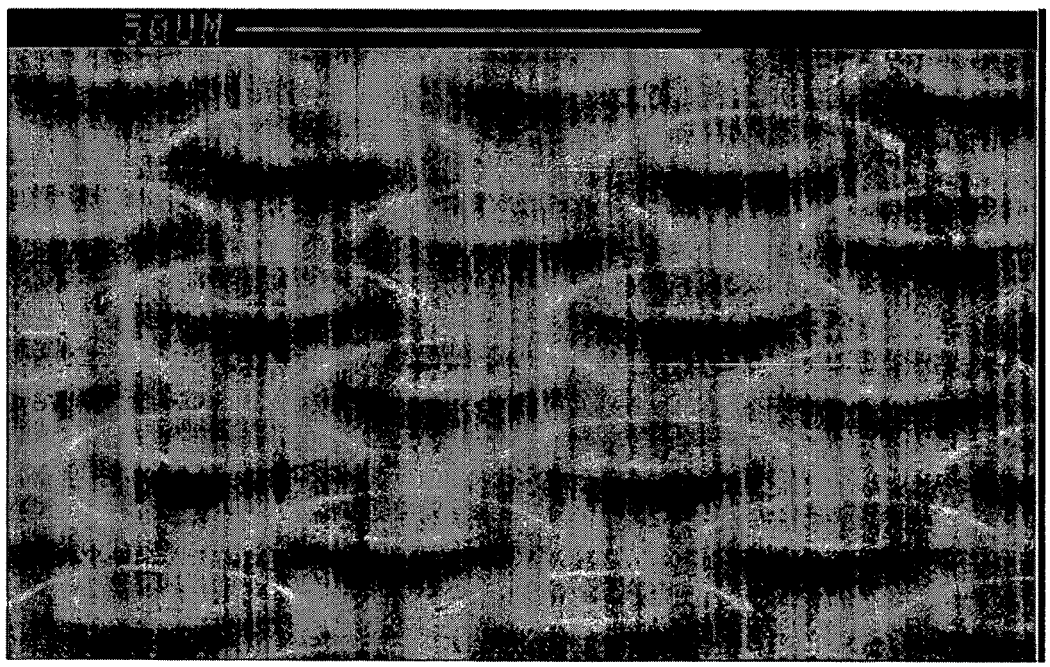
FIG. 2 is a scanning electron micrograph (50 micrometer scale) showing a plurality of dimpled dome-shaped structures according to an embodiment of the invention.

FIG. 2 shows a micrograph of a plurality of dome structures in an array, and each dome structure has a concave depression dispose in the convex upper surface. With reference to FIG. 2, dome-shaped structures may define concave depressions or dimple-structures located at approximately the center of each dome-shaped structure. In one embodiment, the dome-shaped structure may have a diameter in a range of greater than 1 nanometer. The dome-shape may be hemispherical, may have a high degree of arc, or may be flat or shallow. In one embodiment, the dome-shaped structure may have a diameter in a range of from about 1 micron to about 10 microns, from about 10 microns to about 50 microns, from about 50 microns to about 100 microns, from about 100 microns to about 200 microns, from about 200 microns to about 500 microns, from about 500 microns to about 1000 microns, or up to about 5 millimeters.

The dimple-structures may be convex, and may have a high degree of arc, or may be flat or shallow. In one embodiment, the dimple-structures may have a diameter in a range of from about 1 micron to about 10 microns, from about 10 microns to about 50 microns, from about 50 microns to about 100 microns, from about 100 microns to about 200 microns, from about 200 microns to about 500 microns, from about 500 microns to about 1000 microns, or up to about 5 millimeters.

A VCSEL-integrated micro-lens array may be formed from a plurality of dimpled dome-shaped structures according to one embodiment of the invention. The dimpled dome-shaped structures may act as a beam-focusing micro-lens array. By a proper choice of a radiation-polymerizable monomer, binder, and masking conditions, an array of optical devices, particularly optical devices having a range of thicknesses and refractive indices may be created, each of which may be integrated with one or more VCSEL. A divergent laser beam from the VCSEL may pass through the convex surface of the dimple and may emerge as a focused parallel beam. The wavelength spread of the beam, after passing through the dimple-shaped topography array, may be relatively more narrow than that produced by a single VCSEL.

The methods described above may be used to define optical device structures, such as mirrors, waveguides, and lens components. The process may enable the formation of waveguide structures with controlled refractive index and smooth, tapered edges to allow vertical interconnection between the electronic portion of the electro-optic modules and the optical bench portion, or vertical connection between the fiber optic cables and the optical bench. In one embodiment, the optical device structures may be formed without use of reactive ion etching or development, thus making the process more environmentally friendly. The tapered edges may be used as a mirror to direct VCSEL or optical fiber emission into the horizontal optical bench. The polymeric composite material having the desired refractive index gradient may define a waveguide path. In specific embodiments, the optical device structure may include at least one of a waveguide, a 45-degree mirror, or both.

Another aspect may be to create a range of tailor-made topographic profiles that may be used for forming optical devices having a complex architecture. A feature of the method may be that it may include a radiation-induced polymerization of the monomer such that only a portion of the polymerizable monomer present in a binder may be polymerized. The remaining monomer may be volatilized in the succeeding bake step structure. The process of incomplete polymerization may lead to optical devices having surface topographies, compositional changes, and properties that may be potentially different from those where all of the monomer in the exposed area may be polymerized. The process may be carried out using a masking system to permit selection of one or more radiation-polymerized regions and one or more reactive monomer regions, thus leading to a variety of topographic profiles in the resulting optical device structures.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Alpha Aesar, Inc. (Ward Hill, Mass.), Spectrum Chemical Mfg. Corp. (Gardena, Calif.), and the like.

Example 1

Controlling Surface Topography

Into a suitable clean glass container, 60 grams of low color grade polysulfone polymer is added along with 210 grams of anhydrous anisole to form a blend. The blend is warmed to about 50 degrees Celsius and mixed for about 24 hours to dissolve the polysulfone polymer. To this polymer solution is added 20 grams of CY179 epoxy monomer, 0.5 gram of CYRACURE UVI-6976, and 0.3 gram of IRGANOX 1010, and 0.5 grams of BENZOFLEX to form a mixture. The mixture is filtered prior to use through a nominal 0.5-micron membrane filter to give a polymerizable base composition material. A 5-micron thick film of the polymerizable material is prepared on a glass substrate by spin coating the material at 3000 revolutions per minute (rpm) for 30 seconds and heating on a hotplate for 5 minutes at 80 degrees Celsius to remove the solvent. A patterned chrome image on a quartz plate is used to expose and define a pattern on the film to form a sample. A 10 second exposure using a KARL SUSS contact printer is used.

After exposure, the sample is baked on a hotplate for 10 minutes at 80 degrees Celsius, ramped up to 175 degrees Celsius over 1 hour, and held at 175 degrees Celsius for 30 minutes. Surface profilometry measurement of the resulting surface topography indicates an approximately 1.2-micron step structure between the lower un-exposed film surface (4 microns thick) and the upper exposed film surface (5.2 microns thick). Weight loss measurement on other test samples receiving either blanket UV exposure or no exposure, followed by a bake step indicate about 99 weight percent epoxy loss from unexposed areas. In contrast, exposed areas lost less than 5 weight percent epoxy. The refractive index for the exposed areas is about 1.9 percent lower than that measured in the unexposed areas. Visual observation indicates that the sample has relatively reduced haze. Light loss due to scatter is within acceptable parameters.

Example 2

Control of Surface Topography

Into a glass container that is capable of being sealed under vacuum, 19 grams of tetrafluoropropyl methacrylate is distilled. An addition of 56 grams of methyl methacrylate, 93 grams of cyclohexanone, 0.15 gram of N-dodecanethiol, and 0.19 gram of benzoyl peroxide is made to the glass container. The distillate mixture is degassed and sealed under vacuum.

After being heated with mixing at about 75 degrees Celsius for about 24 hours, followed by further heating at about 80 degrees Celsius for about 24 hours, the resulting distillate mixture is cooled and added to 55.5 grams of anisole to form a blend. The resulting blend is a viscous, clear, and colorless acrylate copolymer consisting of about 75 percent poly(methyl methacrylate) and 25 percent poly(tetrafluoropropyl methacrylate), present as 33.5 percent solids in the cyclohexanone-anisole mixed solvent. An additional 10.7 grams of anisole, 5 grams of CY179 epoxy monomer, 0.15 gram of IRGANOX 1010, 5 grams of BENZOFLEX S-552, and 0.13 gram of CYRACURE UVI-6976 is added to a 35 gram portion of the blend. The resulting binder contained about 70 percent by weight of the acrylate polymer and 30 percent by weight of the epoxy monomer. A 5-micron thick film of the binder is prepared on a glass substrate by using the procedure described in Example 1. After patterning, irradiating and baking the film as described in Example 1, surface profilometry measurement of the topography of the resulting film of the composite polymeric material indicated a 3.7 micron film thickness in the UV-exposed areas, and a 2.6 micron film thickness in the unexposed areas. The refractive index for the exposed areas is about 1.4 percent higher than that measured in the unexposed areas. The material is transparent and haze free upon visual observation.

The results from Example 1 and Example 2 indicate that after the bake step structure, the composition of the UV-exposed and the unexposed areas differ from each other. For Example 1, in the UV-exposed areas, the composite polymeric material showed a composition corresponding to approximately 75 percent by weight of polysulfone and 25 percent by weight of the epoxy polymer linkages derived from CY 179, similar to the starting composite material. After baking, however, the composite polymeric material in the unexposed areas showed a composition corresponding to approximately 95 percent by weight of polysulfone and 5 percent by weight of the epoxy polymer linkages derived from the CY 179.

Example 3

Preparation of a Base Composition for Use in an Embodiment of the Invention

A base composition may be formed by preparing a base composition from a binder, a reactive monomer and an anti-haze additive. The amounts and materials are listed in Table 2. The base composition is prepared by blending the polycarbonate, the epoxy resin, and the anti-haze additive together. To form the base composition, the remaining ingredients are added together.

TABLE 2

| Ingredient list | | |
|---|---|---|
| Ingredient | Function | Amount (grams) |
| APEC 9389 | Polycarbonate | 10.5 |
| ERL4221d | Epoxy resin | 5.9 |
| BENZOFLEX S552 | Anti-haze additive | 0.9 |
| Solvent blend* | Solvent | 32 |
| Glycidyl epoxy trimethoxysilane | Adhesion promoter | 0.21 |
| TRITON X-100 | Surfactant | 0.22 |
| Diphenyliodonium Hexafluoroantimonate | Catalyst | 0.13 |

*Anisole, Diglyme, Cylohexanone, Cylopentanone blend

Example 4

Formulations of Base Compositions

Three samples (Samples 4A, 4B, and 4C) are prepared in the same manner as in Example 3, except for the following. Sample 4A has an amount of 75% polycarbonate to 25% epoxy by weight. Sample 4B has an amount of 65% polycarbonate to 35% epoxy by weight. Sample 4C has an amount of about 65% polycarbonate to 35% epoxy, and has 5.5 percent by weight of an anti-haze additive (BENZOFLEX S 552).

Samples 4A, 4B, and 4C are prepared and tested for light transmissivity or loss. Suitable test methods and equipment includes an optical time domain reflectometer, and the like, or an industry standard light loss test method and instrument. Results are shown in Table 3.

TABLE 3

Results of light transmission loss testing.

| Wavelength | Sample 4A | Sample 4B | Sample 4C |
|---|---|---|---|
| 1310 nm (dB/cm) | 0.6 | 1.5 | <0.5 |
| 850 nm (dB/cm) | 0.7 | 1.5 | <0.5 |

The light loss more than doubles from Sample 4A to Sample 4B with the increase of epoxy content. The addition of the anti-haze additive in Sample 4C shows that light loss, even at the higher epoxy content, is less than the lower epoxy content material (Sample 4A) without the anti-haze additive. A higher contrast refractive index (more epoxy content) is achieved without a sacrifice in optical clarity or light transmission capability.

Long-term reliability is improved because the anti-haze additive may also minimize crystallization of the polycarbonate. Polycarbonate crystallization may be an additional cause of scattering loss. Polycarbonate/epoxy polymer waveguide blends with high epoxy content reduce scatter loss if anti-haze additive is included. Further, the presence of the anti-haze additive reduces or eliminates dark field haziness seen in exposed cladding regions of the waveguides formed.

Example 5

Composition Using a Polysulfone Binder

A base composition includes polysulfone binder (60 grams); 3-4-epoxy cyclohexyl methyl-3,4-epoxycyclohexane carboxylate (20 grams); triarylsulfonium hexafluoro antimonate catalyst (0.5 grams); pentaerythritol tetrakis (3-(3,5-di-tert-butyl-4-hydroxyphenyl) propionate) antioxidant (0.3 grams); pentaerythritol tetrabenzoate (0.05 grams); and an anisole solvent (210 grams).

The base composition is exposed to radiation in predetermined regions, which resulted in polymerization of the epoxy component in the exposed regions. The material is baked to volatilize more than 90 percent by weight of the epoxy component from the un-exposed regions during a baking procedure at 150 degrees Celsius for 4 hours.

The refractive index differential of the exposed region relative the unexposed region is greater than 10 percent, and the light loss due to scatter and/or haze is less than 0.5.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A base composition, comprising:
    a binder comprising an optically transmissive polymer;
    a curable and volatile reactive monomer mixed with the binder, wherein the binder and the reactive monomer have differing refractive indices; and
    an anti-haze additive comprising one or more of: a benzoic acid ester of an alkylene glycol or of a polyalkylene glycol;
    wherein the anti-haze additive is present throughout the base composition in an amount greater than 5 weight percent up to about 20 weight percent, based on the total combined weight of the binder and the reactive monomer.

2. The composition as defined in claim 1, wherein the binder comprises a thermoplastic material.

3. The composition as defined in claim 2, wherein the thermoplastic material comprises polycarbonate.

4. The composition as defined in claim 3, wherein the thermoplastic material consists essentially of polycarbonate.

5. The composition as defined in claim 1, wherein the binder is present in an amount less than about 75 weight percent relative to the weight of the reactive monomer.

6. The composition as defined in claim 1, wherein the reactive monomer comprises a thermosettable material.

7. The composition as defined in claim 5, wherein the thermosettable material comprises an oxirane functional group.

8. The composition as defined in claim 6, wherein the oxirane functional group is an epoxy group.

9. The composition as defined in claim 1, wherein the reactive monomer is polyfunctional.

10. The composition as defined in claim 1, wherein the reactive monomer is present in an amount greater than about 25 weight percent based on the weight of the binder.

11. The composition as defined in claim 1, further comprising one or more of a chain-transfer agent, photo-stabilizer, volume expander, free radical scavenger, contrast enhancer, nitrone, UV absorber, or solvent.

12. The composition as defined in claim 1, wherein:
    the binder comprises polycarbonate and is present in an amount of less than about 75 weight percent relative to the weight of the reactive monomer;
    the reactive monomer comprises epoxy and is present in an amount of greater than about 25 weight percent relative to the weight of the binder; and
    a light loss amount of a cured layer formed from the composition is less than 0.5 percent.

13. An article comprising a cured layer formed from the base composition as defined in claim 1, wherein a light loss amount is less than 0.5 percent.

14. The article as defined in claim 12 further comprising a substrate and the cured layer disposed on the substrate; the cured layer comprising
    a core layer; and
    a clad layer adjacent to the core layer,
    wherein the core layer has a higher refractive index relative to the clad layer, and the clad layer extends outward from a surface of the substrate further than the core layer extends from the substrate surface.

15. The article as defined in claim 13, wherein the substrate comprises one or more of glass, quartz, plastic, or ceramic.

16. The article as defined in claim 13, wherein the substrate comprises a semiconductor material.

17. The article as defined in claim 15, wherein the semiconductor material comprises one or more of aluminum, arsenic, gallium, germanium, or silicon; or an oxide, nitride, boride, or carbide of one or more thereof.

18. The article as defined in claim 13, wherein a refractive index differential between clad and core is less than about 5 percent.

19. The article as defined in claim 13, wherein a refractive index differential between clad and core is greater than about 5 percent.

20. The article as defined in claim 13, wherein a refractive index differential between clad and core is up to about 50 percent.

21. A method, comprising:
mixing an anti-haze additive, a reactive monomer, and a thermoplastic binder to form a base composition at a ratio of reactive monomer to thermoplastic binder in a range of greater than about 25:75, wherein the anti-haze additive comprises one or more of: a benzoic acid ester of an alkylene glycol or of a polyalkylene glycol, and wherein the anti-haze additive is present throughout the base composition in an amount greater than 5 weight percent up to about 20 weight percent, based on the total combined weight of the binder and the reactive monomer;
forming the base composition into a layer;
irradiating a portion of the layer to react at least a portion of the reactive monomer in the irradiated layer portion; and
volatilizing unreacted reactive monomer from the layer.

* * * * *